United States Patent [19]

Imoto et al.

[11] Patent Number: 4,714,296

[45] Date of Patent: Dec. 22, 1987

[54] HYDRAULIC CONTROL VALVE

[75] Inventors: Yuzo Imoto, Kariya; Hideo Wakata, Nagoya; Toshihiro Takei, Okazaki; Yoshiyuki Hattori, Toyoake, all of Japan

[73] Assignee: Nippondenso Co., Ltd., Kariya, Japan

[21] Appl. No.: 800,113

[22] Filed: Nov. 19, 1985

[30] Foreign Application Priority Data

Nov. 20, 1984 [JP] Japan ................. 59-245455

[51] Int. Cl.[4] .................... B60T 13/00; B60T 8/44
[52] U.S. Cl. ..................... 303/6 C; 188/349; 303/110; 303/114; 303/116; 303/119; 303/115; 303/22 R
[58] Field of Search ............ 303/6 C, 6 R, 22, 24, 303/115, 119, 113, 117, 60, 10-12, 96, 100, 114, 110, 116, 13-17, 111; 188/349, 181; 180/197; 60/591

[56] References Cited

U.S. PATENT DOCUMENTS

| | | | |
|---|---|---|---|
| 3,588,190 | 6/1971 | Nakano et al. | 303/6 C X |
| 3,667,813 | 6/1972 | Burckhardt et al. | 188/181 C |
| 3,695,732 | 10/1972 | Stelzer | 303/6 C X |
| 3,771,839 | 11/1973 | Fink | 188/181 A X |
| 3,795,423 | 3/1974 | Shields et al. | 303/115 X |
| 3,958,838 | 5/1976 | Totschnig | 303/6 C X |
| 3,969,001 | 7/1976 | Nakamura et al. | 303/113 |
| 4,050,748 | 9/1977 | Belart | 303/115 X |
| 4,199,196 | 4/1980 | Teluo | 303/6 C |
| 4,203,627 | 5/1980 | Kono | 303/6 C |
| 4,229,049 | 10/1980 | Ando | 303/6 C |
| 4,229,052 | 10/1980 | Kondo et al. | 303/115 |
| 4,312,543 | 1/1982 | Kubota | 303/6 C |
| 4,371,215 | 2/1983 | Kawaguchi | 303/6 C |
| 4,438,629 | 3/1984 | Sato et al. | 303/6 C |
| 4,477,125 | 10/1984 | Belart et al. | 303/116 |
| 4,482,190 | 11/1984 | Burgdorf et al. | 303/114 X |
| 4,500,138 | 2/1985 | Mizusawa et al. | 303/6 C |
| 4,578,951 | 4/1986 | Belart et al. | 60/591 X |
| 4,579,393 | 4/1986 | Sato et al. | 303/116 X |
| 4,585,281 | 4/1986 | Schnürer | 303/119 X |
| 4,603,920 | 8/1986 | Otsuki et al. | 303/119 X |
| 4,626,038 | 12/1986 | Hayashi et al. | 303/6 C |
| 4,630,871 | 12/1986 | Imoto et al. | 303/113 |
| 4,647,114 | 3/1987 | Schuett et al. | 303/6 C X |

FOREIGN PATENT DOCUMENTS

| | | |
|---|---|---|
| 58-16947 | 1/1983 | Japan . |
| 59-50844 | 3/1984 | Japan . |
| 59-50846 | 3/1984 | Japan . |
| 0038244 | 2/1985 | Japan ................. 303/6 C |
| 2071245 | 9/1981 | United Kingdom . |

Primary Examiner—Douglas C. Butler
Attorney, Agent, or Firm—Cushman, Darby & Cushman

[57] ABSTRACT

A hydraulic control valve may have a first chamber having an input port, to which an input hydraulic pressure is applied and an output port, and a second chamber having a third port to which a hydraulic control pressure is applied. When a hydraulic pressure below a predetermined level is applied to the first port, the same hydraulic pressure is produced at the second port. When a hydraulic pressure above the predetermined level is applied to the first port, the hydraulic pressure is reduced at a fixed ratio, and thereby a hydraulic pressure lower than the hydraulic pressure applied to the first port is produced at the second port. Thus the hydraulic control valve functions as a proportional valve. When a hydraulic control pressure is applied to the third port, the first and second port are disconnected. Thus the hydraulic control valve functions as a cutoff valve.

13 Claims, 10 Drawing Figures

HYDRAULIC CONTROL VALVE

BACKGROUND OF THE INVENTION

1. Field of the invention

The present invention relates to a hydraulic control valve employed, for example, in a hydraulic brake system of a vehicle and capable of relieving the pressure when the same is excessive.

2. Description of the Prior Art

Such a hydraulic control valve is designated generally as a proportional valve. Known hydraulic control valves are disclosed in Japanese Unexamined Patent Publication Nos. 59-50844 and 59-50846 which were published in Japan in 1984.

Hydraulic control valves may employed, for example, in automotive hydraulic brake systems. Such a hydraulic control valve is provided in a hydraulic line between the master cylinder and the rear wheel cylinder. When a fluid pressure exceeding a predetermined level is applied to the rear wheel cylinder during the operation of the brake system, the hydraulic control valve relieves the pressure working on the rear wheel cylinder so that the front and rear wheels are braked at an appropriate braking ratio.

When a vehicle is equipped with a traction control system or an antiskid control system to prevent the driving wheels from slipping during acceleration or braking, the hydraulic brake circuit is provided with a cutoff valve to control the hydraulic circuit in addition to the proportional hydraulic control valve.

However, providing the hydraulic circuit with those two valves complicates the hydraulic circuit, requires a large space for the hydraulic circuit and enhances the weight of the hydraulic circuit.

SUMMARY OF THE INVENTION

Accordingly, it is an object of the present invention to simplify a hydraulic circuit, such as the hydraulic brake circuit of an automotive brake system.

The present invention provides a hydraulic control valve capable of performing the function of both a proportional valve and a cutoff valve.

A hydraulic control valve may have a first chamber having an input port, to which an input hydraulic pressure is applied and an output port, and a second chamber having a third port to which a hydraulic control pressure is applied. When a hydraulic pressure below a predetermined level is applied to the first port, the same hydraulic pressure is produced at the second port. When a hydraulic pressure above the predetermined level is applied to the first port, the hydraulic pressure is reduced at a fixed ratio, and whereby a hydraulic pressure lower than the hydraulic pressure applied to the first port is produced at the second port. Thus the hydraulic control valve functions as a proportional valve. When a hydraulic control pressure is applied to the third port, the first and second port are disconnected. Thus the hydraulic control valve functions as a cutoff valve.

BRIEF DESCRIPTION OF THE DRAWINGS

These and other objects and advantages of this invention will become apparent and more readily appreciated from the following description of presently preferred exemplary embodiments of the invention, taken in conjunction with the accompanying drawings, of which.

DETAILED DESCRIPTION OF THE EMBODIMENTS

Preferred embodiments of the present invention will be described hereinafter in conjunction with the accompanying drawings.

Figure 1:
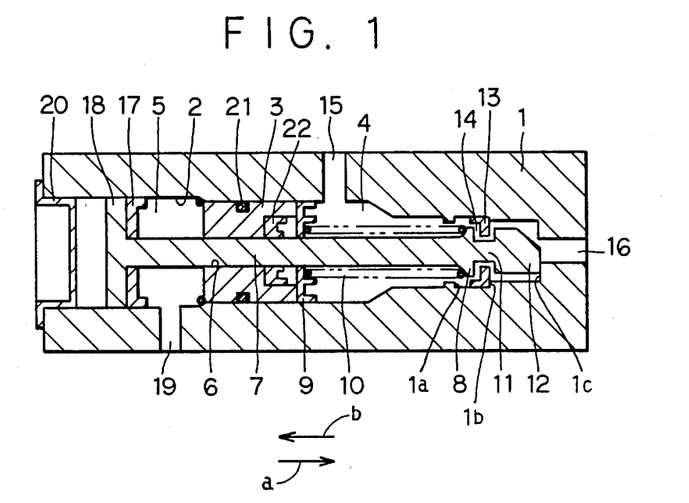
FIG. 1 is a sectional view of a first embodiment of a hydraulic control valve according to the present invention.

Referring to FIG. 1 showing a first embodiment of a hydraulic control valve according to the present invention, a cylinder 2 is formed within a valve body 1. The interior of cylinder 2 is partitioned into a first chamber 4 and a second chamber 5 by a partition wall 3 fixed in cylinder 2 and provided with a through hole 6. A piston 7 is slidably disposed in through hole 6. An enlarged diameter portion 8 is formed at one end of piston 7 on the side of first chamber 4. A compression coil spring 10 is disposed between stopper 9 placed adjacent to partition wall 3 and enlarged portion 8 to apply a resilient force, acting in a direction indicated by arrow a, on piston 7. An annular groove 11 and a head 12 are formed in piston 7 beyond enlarged portion 8 for pressure relieving action. The action of spring 10 biases head 12 of piston 7 toward stopper wall 1c of body 1. A valve seat 13 is provided movably between annular convex portion 1a and step portion 1b in cylinder 2. Valve seat 13 cooperates with annular groove 11 to define a passage 14.

The first chamber 4 has a first port of the invention such as input port 15, communicating with a hydraulic pressure source, not shown, and a second port of the invention such as output port 16, communicating with a functional unit, such as a wheel cylinder, not shown. A bottom head 18 is formed at the end of piston 7 on the side of second chamber 5. Bottom head 18 fits cylinder 2 and is mounted with a sealing member 17. Piston 7 integrally has the functions of a pressure relieving piston and a control piston. Second chamber 5 has a third port, such as control port 19, communicating with a hydraulic control pressure source, not shown. Indicated at 20 is an end cap sealing one end of cylinder 2 and at 21 and 22 are sealing members provided on partition wall 3.

The manner of operation of the first embodiment thus constructed will be described hereinafter.

When a fluid pressure of a magnitude below a fixed value L (FIG. 2) is applied to input port 15 by the hydraulic pressure source, piston 7 is pushed in the direction indicated by arrow a so that head 12 of piston 7 is pressed against stopper wall 1c, causing passage 14 to open between valve seat 13 and annular groove 11. Consequently, input port 15 communicates with output port 16 by means of first chamber 4 and passage 14. Accordingly, the same fluid pressure prevails at input port 15 and output port 16.

When hydraulic pressure is applied to input port 15, a force is produced by the fluid pressure prevailing at output port 16 which acts on the cross-sectional area of piston 7 to bias piston 7 in a direction indicated by arrow b.

Figure 2:
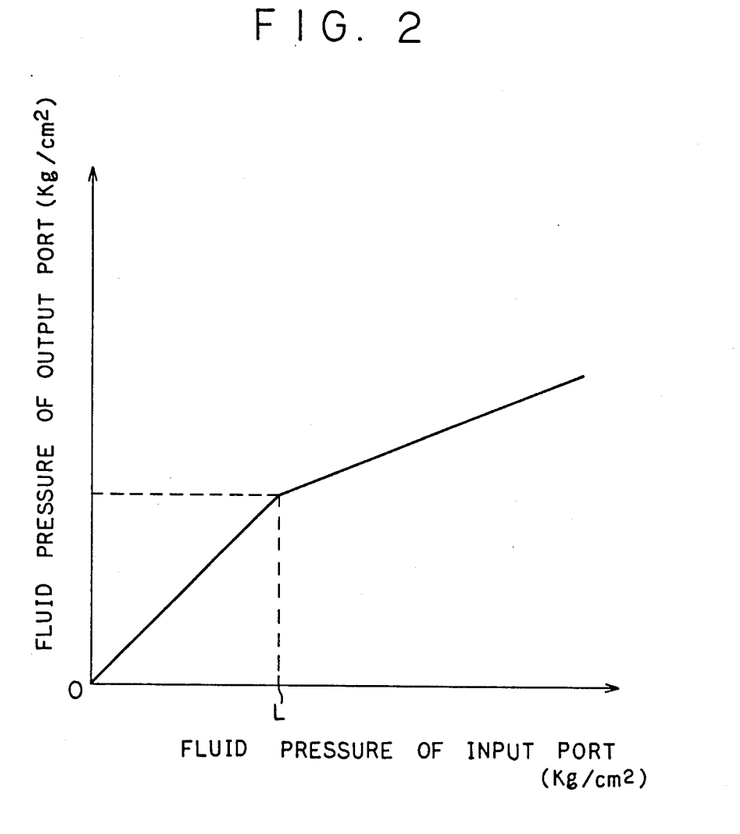
FIG. 2 is a graph of assistance in explaining the functions of the hydraulic control valve of FIG. 1.

When a fluid pressure higher than the fixed value L shown in FIG. 2 is applied to input port 15, this force becomes greater than the force produced by compression coil spring 10 pushing piston 7 in the direction of the arrow a. Consequently, piston 7 is shifted slightly in the direction of arrow b as indicated in FIG. 1 until head 12 comes into contact with valve seat 13. As the fluid pressure applied to input port 15 increases a bit more, the fluid pressure acting on valve seat 13 in the direction of arrow a is higher than that in the direction of arrow b, so that piston 7 is shifted in the direction indicated by arrow a. Accordingly input port 15 communicates with output port 16 by means of passage 14. As soon as piston 7 has disengaged with valve seat 13 the force acting on piston 7 in the direction of arrow b is greater than the force in the direction of arrow a as mentioned above, so passage 14 closes again. Thus, when the fluid pressure at input port 15 is higher than the fixed value L, piston 7 vibrates minutely to alternately contact with and separate from valve seat 13. Consequently, the fluid pressure at output port 16 increases in reduced proportion to the fluid pressure at input port 15 at pressures above fixed value L. That is, as shown in FIG. 2, when the fluid pressure applied to input port 15 is below the fixed value L, the fluid pressure applied to input port 15 is applied directly to output port 16. When the fluid pressure applied to input port 15 is higher than the fixed value L, the fluid pressure at output port 15 is a fixed proportion of the pressure at input port 16.

Figure 3:
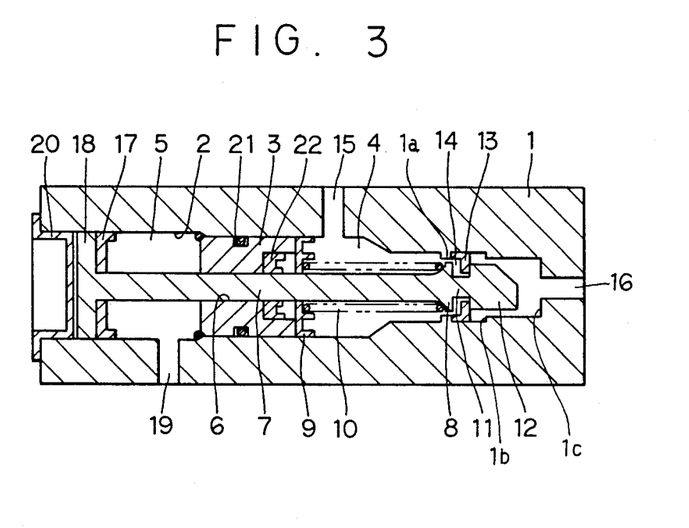
FIG. 3 is a sectional view of assistance in explaining the operation of the hydraulic control valve of FIG. 1.

Fluid pressure may also be applied through control port 19 to second chamber 5 by a hydraulic control pressure source. As a result, pressure acts on bottom head 18 of piston 7 in the direction indicated by arrow b. This pressure moves piston 7 in the direction indicated by arrow b against the force of spring 10 and with the face of the fluid pressure that acts on piston 7 in the direction indicated by arrow b to establish a state illustrated in FIG. 3, in which head 12 of piston 7 is pressed against valve seat 13 to close passage 14 to disconnect input port 15 from output port 16.

As has been described, normally the hydraulic control valve functions as an ordinary proportional valve. However, the valve can acts as a cutoff valve which disconnects input port 15 from output port 16, when a fluid pressure is applied to control port 19.

Accordingly, the employment of this hydraulic control valve embodying the present invention in a hydraulic circuit simplifies the hydraulic circuit as the hydraulic control valve is also capable of functioning as a cutoff valve.

Figure 4:
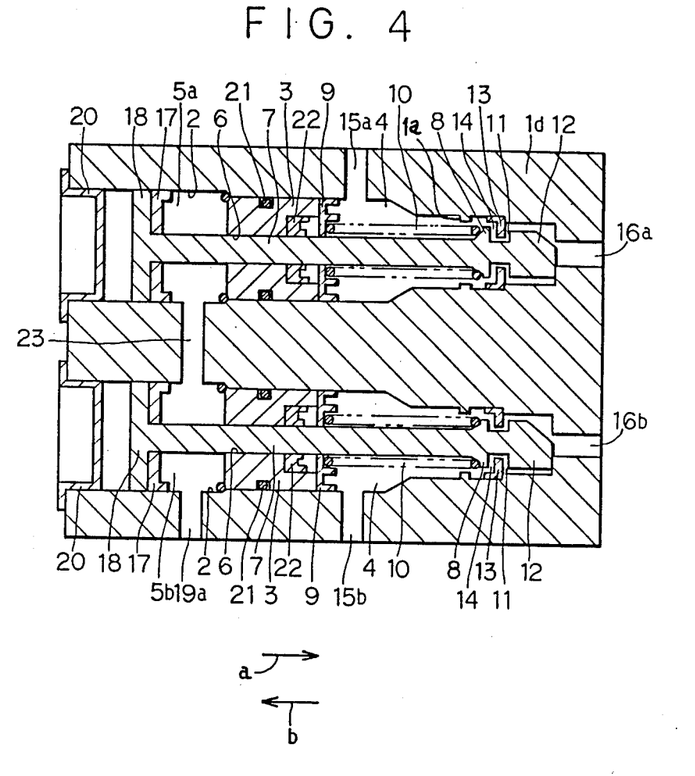
FIG. 4 is a sectional view of a second embodiment of a hydraulic control valve according to the present invention.

FIG. 4 shows a second embodiment of the present invention. The hydraulic control valve in the second embodiment comprises two hydraulic control valve units each being the same as the hydraulic control valve in the first embodiment. The two hydraulic control valve units are accommodated in parallel to each other in a single valve body 1d with the respective second chambers 5a and 5b thereof interconnected by a connecting hole 23. The second embodiment has two input ports 15a and 15b, two output ports 16a and 16b and one common control port 19a.

In the second embodiment, each hydraulic control valve unit functions individually as a proportional valve. When fluid pressure is applied to control port 19a, fluid pressure is applied to both second chambers 5a and 5b through connecting hole 23, so that pistons 7 of both the hydraulic control valve units are moved simultaneously in a direction indicated by arrow b, and thereby respective input ports 15a and 15b and output ports 16a and 16b are disconnected simultaneously. In this embodiment, since the two hydraulic control valve units can be controlled by one control port 19a, the piping of the hydraulic circuit is simplified.

A third embodiment of the present invention will be described hereinafter with reference to FIG. 5.

Figure 5:
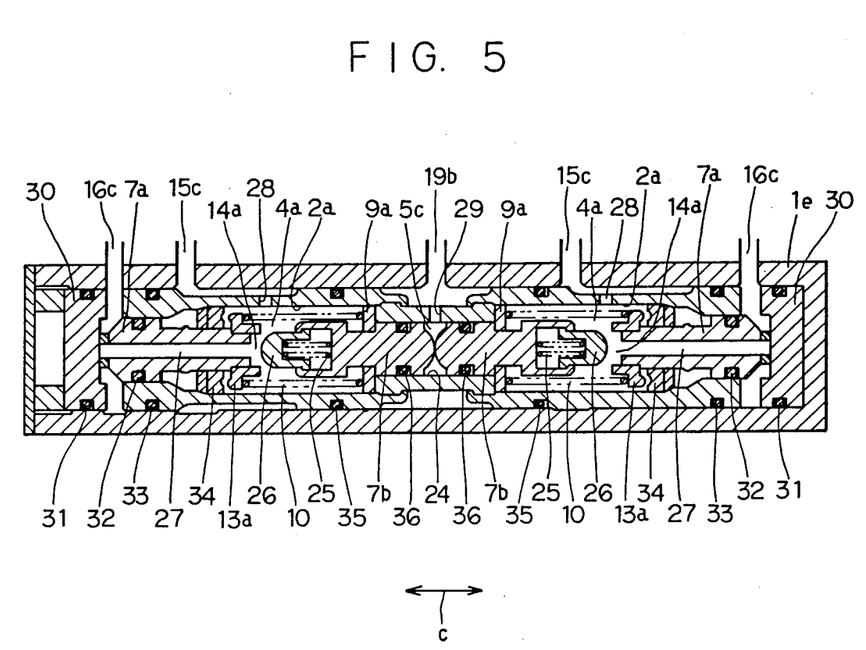
FIG. 5 is a sectional view of a third embodiment of a hydraulic control valve according to the present invention.

Referring to FIG. 5, two proportional valve units are accommodated symmetrically and coaxially in a valve body 1e. Right and left pressure reducing cylinders 2a are disposed on the right side and on the left side, respectively, of valve body 1e. A control cylinder 24 is interposed between the right and left pressure reducing cylinders 2a. Control pistons 7b are fitted slidably into control cylinder 24 and define a second chamber 5c therebetween. Control pistons 7b separate control chamber 5c from respective first chambers 4a of the right and left pressure reducing cylinders, respectively. Each control piston 7b is provided at the extremity thereof with a poppet 26 backed up with a shock absorbing spring 25.

A pressure reducing piston 7a having an internal through hole 27 and mounted at one end thereof with a valve seat 13a is fitted slidably into pressure reducing cylinder 2a. A compression spring 10 is disposed between a spring seat 9a placed adjacent to one end of control cylinder 24 and valve seat 13 in each pressure reducing cylinder. In this embodiment, pressure reducing pistons 7a and control pistons 7b are provided separately. Input ports 15c communicate with output ports 16c by means of through holes 28 formed in pressure reducing cylinders 2a, first chambers 4a and through holes 27 of pressure reducing pistons 7a. Second chambers 5c communicate with a control port 19b by means of a through hole 29 formed in control cylinder 24. Stop caps 30 are provided at the outer ends of the pressure reducing cylinders 2a, respectively. Indicated at 31 to 36 are sealing members.

A fluid pressure applied to either input port 15c is propagated through through hole 28, first chamber 4a, a passage 14a and through hole 27 to corresponding output port 16c. When the input fluid pressure is higher than a fixed value L, pressure reducing piston 7a vibrates minutely in directions indicated by a double-headed arrow c under the influence of the fluid pressure, while valve seat 13a comes into contact with and separates from poppet 26 to alternately close and open passage 14a. Thus the assembly functions as an ordinary proportional valve.

Figure 6:
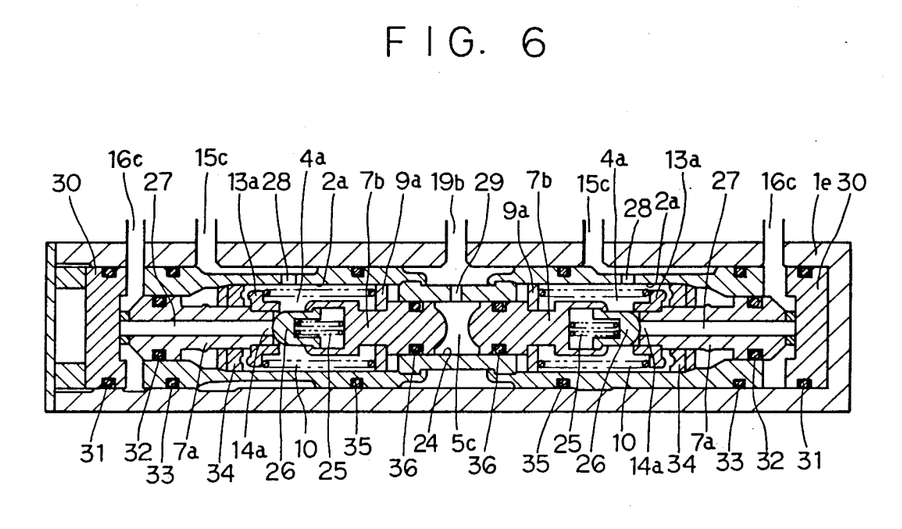
FIG. 6 is a sectional view of assistance in explaining the operation of the third embodiment of the present invention.

When a fluid pressure is applied to control port 19b, control pistons 7b are moved away from each other as illustrated in FIG. 6, so that second chambers 5c is expanded. Consequently, poppets 26 of control pistons 7b are brought into contact with valve seats 13a of the pressure reducing pistons 7a to close the passages 14a completely. Thus input ports 15c and output ports 16c are disconnected and the hydraulic control valve functions as a so-called cutoff valve.

Figure 7:
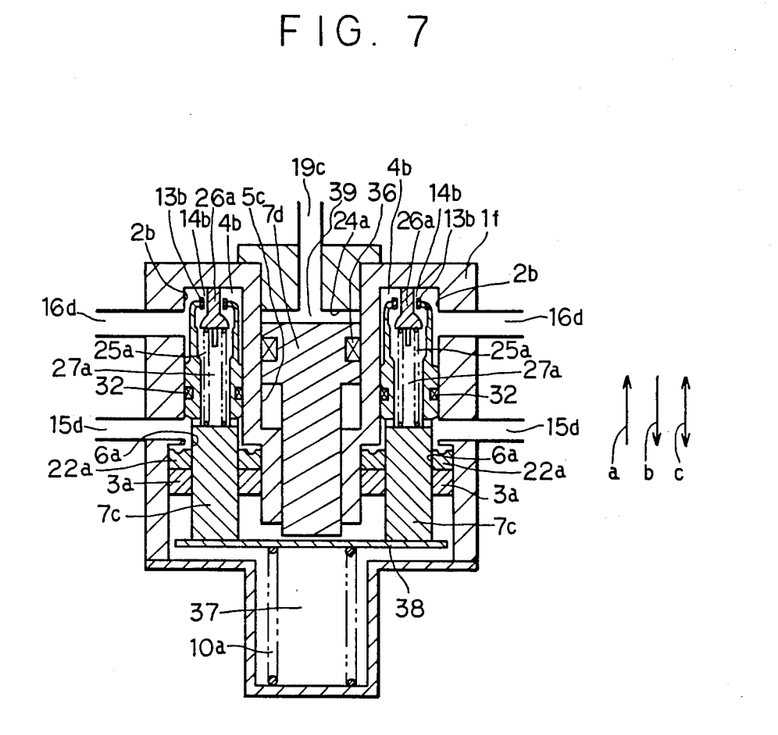
FIG. 7 is a sectional view of a fourth embodiment of a hydraulic control valve according to the present invention.

A fourth embodiment of the present invention will be described with reference to FIG. 7.

A hydraulic control valve in the fourth embodiment comprises two proportional valve units disposed symmetrically with respect to a cutoff valve unit. A valve body 1f has pressure reducing cylinders 2b and a control cylinder 24a. Partition walls 3a separate control cylinder 24a from pressure reducing cylinders 2b. First chambers 4b are formed in pressure reducing cylinders 2b, respectively, and a second chamber 5c is formed in control cylinder 24a. A through hole 6a is formed in each partition wall 3a. A pressure reducing piston 7c, having a through hole 27a and provided at the upper end thereof with a valve seat 13b, slides within through hole 6a into pressure reducing cylinder 2b. A poppet 26a is attached to the upper end of each pressure reducing cylinder 2b of valve body 1f. Poppet 26a extends into through hole 27a of pressure reducing piston 7c. A shock absorbing compression spring is disposed between poppet 26a and pressure reducing piston 7c.

A control piston 7d is slidably disposed in control cylinder 24a. Control piston 7d separates a spring chamber 37, accommodating a resilient coil spring 10a and an equalizer 38 abutting one end of control piston 7d from control chamber 39.

The lower end of pressure reducing piston 7c is in contact with equalizer 38 in spring chamber 37. Thus pressure reducing piston 7c is urged resiliently in a direction indicated by arrow a in FIG. 7 through equalizer 38 by spring 10. In this embodiment, pressure reducing pistons 7c and control piston 7d are provided separately.

Input ports 15d communicate with output ports 16d by means of first chambers 2b and through holes 27a of pressure reducing pistons 7c. Control port 19c communicates with control chamber 39 of second chamber 5c. Indicated at 22a, 32 and 36 are sealing members.

A fluid pressure applied to input port 15d is propagated through first chamber 4b, through hole 27a of pressure reducing piston 7c and a passage 14b to output port 16d. When a fluid pressure higher than a fixed value L is applied to input port 15d pressure reducing piston 7c vibrates minutely in directions indicated by double-headed arrow c under the combined effect of the fluid pressure that acts in the direction indicated by arrow b and the force of spring 10a acting in the direction indicated by arrow a. Consequently, valve seat 13b comes into contact with and separates from poppet 26a alternately, and thereby passage 14b is closed and opened alternately. Thus a proportional valve function is achieved.

Figure 8:
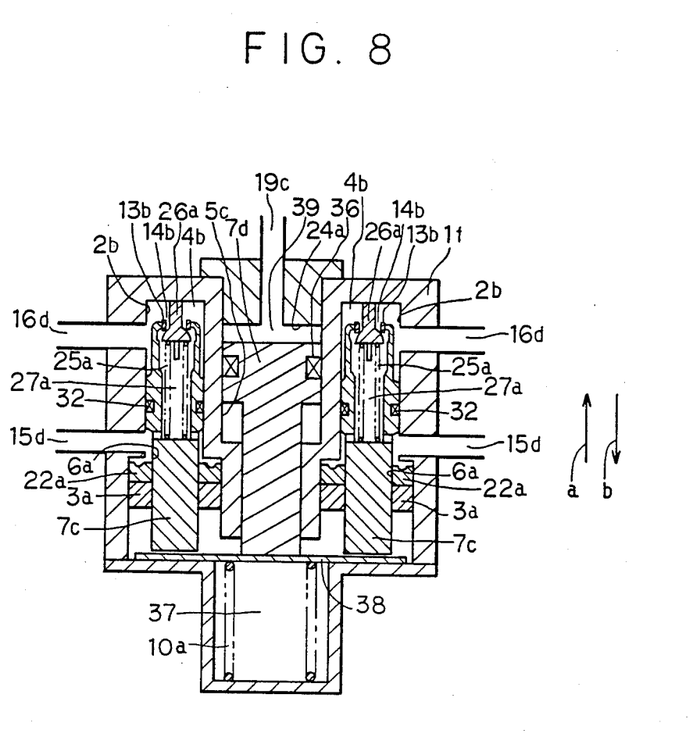
FIG. 8 is a sectional view of assistance in explaining the operation of the fourth embodiment of the present invention.

When fluid pressure is applied to control port 19c, the pressure in control chamber 39 is enhanced to move control piston 7d in the direction indicated by arrow b so as to compress spring 10a through equalizer 38 disposed in spring chamber 37. Consequently, as illustrated in FIG. 8, the resilient force of spring 10a acting through equalizer 38 on pressure reducing piston 7c in the direction indicated by arrow a is removed from pressure reducing piston 7c. At this moment, the fluid pressure prevailing within first chamber 4b is higher than the atmospheric pressure prevailing in spring chamber 37 of second chamber 5c, therefore, pressure reducing piston 7c moves in the direction indicated by arrow b, and thereby valve seat 13b abuts on poppet 26a to close passage 14b. Consequently, input port 15d and output port 16d are disconnected completely. Thus the hydraulic control valve functions as a cutoff valve.

Figure 9:
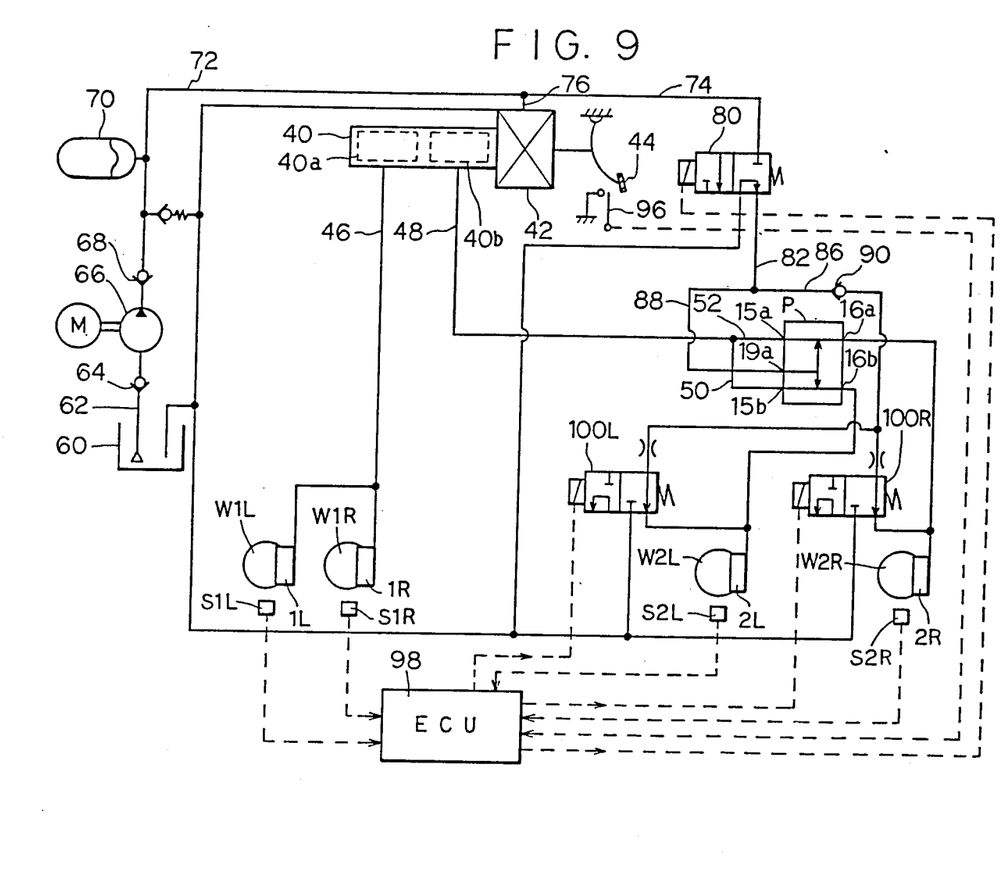
FIG. 9 is a hydraulic circuit diagram of an automative brake system employing the hydraulic control valve of FIG. 4.

An exemplary application of the hydraulic control valve in the second embodiment shown in FIG. 4 to an automotive propulsion control system will now be described. FIG. 9 illustrates an automotive propulsion control system of a rear-drive automobile having rear wheels W2R and W2L, namely, driving wheels, and front wheels W1R and W1L.

Referring to FIG. 9, a master cylinder 40 is joined to a hydraulic booster 42 for amplifying a pressure applied to a brake pedal 44. The master cylinder 40 comprises a first hydraulic pressure generating chamber 40a and a second hydraulic pressure generating chamber 40b.

The first hydraulic pressure generating chamber 40a is connected by a conduit 46 to wheel cylinder 1L of left front wheel W1L and wheel cylinder 1R of right front wheel W1R, while the second hydraulic pressure generating chamber 40b is connected by a conduit 48 and branch conduits 50 and 52 to input ports 15a and 15b of hydraulic control valve P of FIG. 4. Output ports 16a and 16b of hydraulic control valve P are connected to wheel cylinder 2R of right rear wheel W2R and wheel cylinder 2L of left rear wheel W2L, respectively. Thus the front-wheel assembly and the rear-wheel assembly are connected individually to master cylinder 40 through separate piping systems, respectively.

Hydraulic booster 42 is connected through conduits 76 and 72 and a check valve 68 to a motor-driven hydraulic pump 66. The suction port of hydraulic pump 66 is connected through a check valve 64 and a conduit 62 to a reservoir 60. Check valves 64 and 68 permit flows toward hydraulic booster 42. An accumulator 70 is provided in conduit 72. Accumulator 70 and hydraulic pump 66 constitute an auxiliary pressure source.

Hydraulic pump 66 is connected through conduits 72 and 74 to one of the input ports of a selector valve 80. One of the output ports of selector valve 80 communicates with reservoir 60. The other output port of selector valve 80 is connected to control port 19a of hydraulic control valve P through conduits 82 and 88. A conduit 86 branches off from conduit 82. Conduit 86 branches after a check valve 90. One branch of conduit 86 is connected through a selector valve 100L to wheel cylinder 2L of left rear wheel W2L and the other branch of the same is connected through a selector valve 100R to wheel cylinder 2R of right rear wheel W2R. The respective other output ports of selector valves 100L and 100R are connected to reservoir 60. The check valve 90 permits a flow toward rear wheel cylinders 2L and 2R.

Selector valve 80 is a spring-offset three-port two-position solenoid valve which is changed from a position shown in FIG. 9 (referred to as "by-pass position" hereinafter) into a left-hand position as shown in FIG. 9 (referred to as "connecting position" hereinafter), when the solenoid is energized. Selector valves 100L and 100R are spring-offset three-port two-position solenoid valves which are changed from a connecting position as shown in FIG. 9 into a by-pass position.

The front wheels (undriven wheels) and the rear wheels (driving wheels) are provided with undriven wheel speed sensors S1R and S1L and driving wheel speed sensors S2R and S2L, respectively. The undriven wheel speed sensors and the driving wheel speed sensors each generates a pulse signal corresponding to the rotating speed of the corresponding wheel. Brake pedal 44 is associated with a brake switch 96, which is closed only while brake pedal 44 is depressed. The output signals of undriven wheel speed sensors S1L and S1R, driving wheel speed sensors S2L and S2R and brake switch 96 are driven to an electronic control unit (ECU) 98 as input signals. ECU 98 calculates wheel speeds, slip factor, acceleration and deceleration on the basis of those input signals and provides control signals to control the positions of selector valves 80, 100R and 100L.

The manner of operation of the hydraulic circuit thus constituted will be described hereinafter.

(A) Normal braking mode:

Selector valve 80 is in the by-pass position and the selector valves 100R and 100L are in the connecting position as illustrated in FIG. 9.

When brake pedal 44 is depressed gradually to stop the vehicle, a braking pressure generated by first hydraulic pressure generating chamber 40a of master cylinder 40 is applied through conduit 46 to wheel cylinders 1R and 1L to brake right front wheel W1R and left front wheel W1L. A braking pressure generated by second hydraulic pressure generating chamber 40b is applied through conduits 48, 50 and 52 to wheel cylinders 2R and 2L to brake right rear wheel W2R and left rear wheel W2L. Since hydraulic control valve P which functions as a proportional valve is provided in conduit 48 interconnecting master cylinder 40 to rear wheel cylinders 2R and 2L, the fluid pressure applied to rear wheel cylinders 2R and 2L is reduced at a fixed ratio relative to the fluid pressure applied to front wheel cylinders 1R and 1L so that the braking force is ideally distributed among front wheels W1R and W1L and rear wheels W2R and W2L.

The brake fluid does not flow between the piping of the front brake system and the piping of the rear brake system. Therefore, individual fluid pressures prevail in the piping of the front brake system and the piping of the rear braking system, respectively.

(B) Slip control mode:

When the driving wheels, namely, rear wheels W2R and W2L, slip when the vehicle starts, during the accelerated running or during the running along a curve, and brake pedal 44 is not depressed, the slip of the rear wheels is controlled. The slip control operation will be described hereinafter.

ECU 98 decides, on the basis of a rotating speed difference etween the front wheels and the rear wheels obtained by processing rotating speed signals given thereto by the wheel speed sensors S1R, S1L, S2R and S2L, that the rear wheels are slipping. When ECU 98 detects slipping, it gives a control signal to the selector valve 80 to change the position of selector valve 80 into the connecting position. Consequently, the high-pressure fluid flows through conduits 72 and 74, selector valve 80 and conduit 82. The high-pressure fluid flows further through conduit 88 to control port 19a of hydraulic control valve P, and through conduit 86 and check valve 90, and then through selector valves 100R and 100L, which are in the connecting position, into rear wheel cylinders 2R and 2L, respectively. Consequently, the hydraulic control valve P functions as a cutoff valve and shuts off conduits 50 and 52 individually, namely, disconnects rear wheel cylinders 2R and 2L individually from master cylinder 40, while rear wheel cylinders 2R and 2L are actuated. In this state, the ECU 98 changes the respective positions of selector valves 80, 100R and 100L appropriately between the by-pass position and the connecting position to regulate the fluid pressure within rear wheel cylinders 2R and 2L so that rear wheels W2R and W2L will not interfere with each other in a conventional, well known manner as if a separate cutoff valve and proportional valve were used.

Consequently, rear wheels W2R and W2L are braked and slipping is suppressed. Thus the so-called traction control is achieved.

Since the hydraulic control valve P of FIG. 4 functions as a cutoff valve for separating the front brake system from the rear brake system to control the slip of the driving wheels during accelerated running, any particular cutoff valve which usually is employed in the conventional automotive propulsion control system is not needed.

A modification of the automotive propulsion control system of FIG. 9 will be described hereinafter with reference to FIG. 10.

Figure 10:
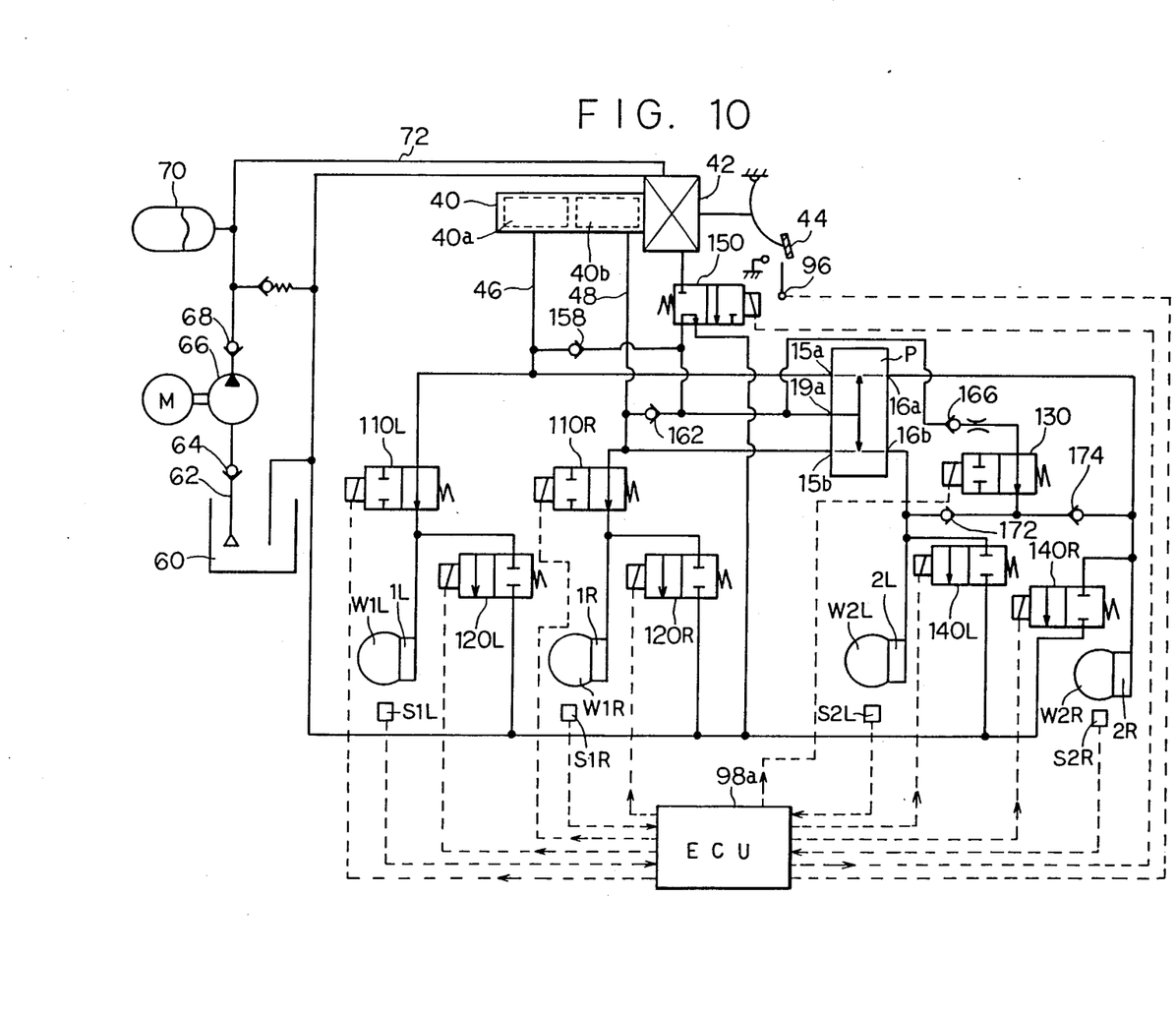
FIG. 10 shows a modification of the hydraulic circuit of FIG. 9.

FIG. 10 illustrats an antiskid control system employing hydraulic control valve P of FIG. 4 and applied to a front-drive automobile having front wheels W1R and W1L and rear wheels W2R and W2L. The antiskid control system includes two brake piping systems, namely, a brake piping system for left front wheel W1L and right rear wheel W2R and a brake piping system for right front wheel W1R and left rear wheel W2L.

Referring to FIG. 10, first hydraulic pressure generating chamber 40a of master cylinder 40 is connected by a branching conduit 46 to wheel cylinder 1L of left front wheel W1L through a cutoff valve 110L and to wheel cylinder 2R of right rear wheel W2R through hydraulic control valve P. Similarly, second hydraulic pressure generating chamber 40b of master cylinder 40 is connected by a branching conduit 48 to wheel cylinder 1R of right front wheel W1R through a cutoff valve 110R and to wheel cylinder 2L of left rear wheel W2L through hydraulic control valve P.

Cutoff valves 120R, 120L, 140R and 140L are provided in conduits connecting wheel cylinders 1R, 1L, 2R and 2L to a reservoir 60, respectively.

A hydraulic booster 42 is connected to the input port of a three-port two-position selector valve 150. One of the output ports of the selector valve 150 is connected to reservoir 60, while the other output port of the same is connected through a check valve 158 to a brake system for left front wheel W1L and right rear wheel W2R, and through a check valve 162 to brake system for right front wheel W1R and left rear wheel W2L. The latter output port of the selector valve 150 is connected also to control port 19a of hydraulic control valve P and to wheel cylinders 2R and 2L of the rear wheels through a check valve 166 and a pressure intensifying valve 130 and further through check valves 174 and 172 to the rear wheel cylinders 2R and 2L, respectively. Check valves 158, 162, 166, 172 and 174 permit flow from the hydraulic booster 42 toward wheel cylinders 1R, 1L, 2R and 2L.

Selector valve 150 is a three-port two-position solenoid valve. The position of selector valve 150 is changed from the by-pass position to the connecting position, when the solenoid is energized. Cutoff valve 110R, 110L and pressure intensifying valve 130 are two-port two-position solenoid valves, the position of which is changed from the connecting position to the cutoff position when the solenoid is energized. Cutoff valves 120R, 120L, 140R and 140L are two-port two-position solenoid valves, the position of which is changed from the cutoff position to the connecting position, when the solenoid is energized.

The manner of operation of the hydraulic circuit thus constructed will be described hereinafter.

(A) Normal braking mode:

Selector valve 150 is in the by-pass position, cutoff valves 110R and 110L and pressure intensifying valve 130 are in the connecting position, and cutoff valves 120R, 120L, 140R and 140L are in the cutoff position.

When brake pedal 44 is depressed to stop the vehicle, a braking fluid pressure generated by first hydraulic pressure generating chamber 40a of master cylinder 40 is applied through the branching conduit 46 to wheel cylinder 1L of left front wheel W1L through cutoff valve 110L and to wheel cylinder 2R of right rear wheel W2R through hydraulic control valve P. Simultaneously, a braking fluid pressure generated by second hydraulic pressure generating chamber 40b is applied through conduit 48 to wheel cylinder 1R of right front wheel W1R through cutoff valve 110R and wheel cylinder 2L of left rear wheel W2L through hydraulic control valve P. Consequently, the brake systems for the left front wheel and the right rear wheel and for the right front wheel and the left rear wheel are actuated.

(B) Antiskid control mode:

The manner of operation of the hydraulic circuit in the antiskid control mode will now be described. When brake pedal 44 is depressed, the hydraulic circuit operates in the same manner as that in the normal braking mode and the internal pressures of wheel cylinders 1R, 1L, 2R and 2L are raised gradually until the wheel cylinders tend to lock the corresponding wheels. Then, an electronic control unit (ECU) 98a decides on the basis of signals from rotating speed sensors S1R, S1L, S2R and S2L, that the wheels are in a locked state, and provides an output signal to change the position of selector valve 150 into the connecting position so that a fluid pressure is applied to control port 19a of hydraulic control valve P by hydraulic booster 42 to actuate hydraulic control valve P as a cutoff valve. Consequently, wheel cylinder 1L of left front wheel W1L and wheel cylinder 2R of right rear wheel W2R, and wheel cylinder 1R of right front wheel W1R and wheel cylinder 2L of left rear wheel W2L are disconnected, respectively. At the same moment, ECU 98a controls cutoff valves 110R, 110L, 120R, 120L, 140R and 140L and pressure intensifying valve 130 so that the internal fluid pressures of wheel cylinders 1R, 1L, 2R and 2L are reduced to fluid pressures necessary to maintain optimum slip factors for front wheels W1R and W1L and rear wheels W2R and W2L. This control may occur in a contentional, well known manner as if separate cutoff and proportional valves where employed.

Since the antiskid control system of FIG. 10 employs the hydrauic control valve of FIG. 4, any additional cutoff valve is not necessary even when the antiskid control system has a cross-piping hydraulic circuit, and hence the hydraulic circuit is simplified.

The antiskid control system of FIG. 10 employs hydraulic control valve P of FIG. 4 in the cross-piping hydraluic circuit. However, the antiskid control system may employ two hydraulic control valves of FIG. 1 or one hydraulic control valve of FIGS. 5 or 7.

The solenoid cutoff valves employed in the hydraulic circuits of FIGS. 9 and 10 may be substituted by cutoff valves driven by other driving means, such as those driven by a piezo-electric device or a hydraulic device.

Although the present invention has been described as applied to automotive brake system, it is to be understood that the present invention is not limited to those embodiments and applications described hereinbefore, and that various changes and modifications may be made in the invention without departing from the spirit and scope thereof.

What is claimed is:

1. A hydraulic control system for a vehicle having driving wheels comprising:

means for selectively producing a first hydraulic pressure;

wheel cylinder means for braking said driving wheels in response to said production of said first hydraulic pressure;

a hydraulic pump pumping a fluid up to a second hydraulic pressure;

selector valve means, serially connected to said hydraulic pump, for selecting either a by-pass position in a normal mode or, in response to a slip condition of said wheels, selecting a connecting position, and for passing said second hydraulic pressure through said selector valve means when said selector valve means is in said connecting position;

means, connected serially between said wheel cylinder means and said selector valve means, for selectively applying said second hydraulic pressure from said selector valve means to said wheel cylinder means in response to said slip condition of said wheels; and a hydraulic control valve connected serially between said first hydraulic pressure producing means and said wheel cylinder means, and commonly connected, with said second hydraulic pressure applying means, to said wheel cylinder means, said hydraulic control valve including:

a valve body having first and second chambers formed separately therein;

an input port formed in said valve body so as to communicate with said first chamber, and to receive said first hydraulic pressure from said first hydraulic pressure producing means;

an output port formed in said valve body so as to communicate with said first chamber and to output said first hydraulic pressure to said wheel cylinder means;

a pressure reducing piston provided slidably within said first chamber so as to selectively interconnect said input and output ports;

means for biasing said pressure reducing piston to interconnect said input and output ports, said pressure reducing piston and said biasing means including means for reducing said first hyraulic pressure applied to said input port at a fixed ratio to a lower hydraulic pressure provided at said output port when said first hydraulic pressure applied to said input port is higher than a predetermined level;

a third port formed in said valve body so as to communicate with said second chamber, and to receive said second hydraulic pressure from said selector valve means when said selector valve means selects said connecting position; and control piston means for disconnecting said input and output ports when said second hydraulic pressure is applied to said third port.

2. A hydraulic control system according to claim 1, further comprising a partition wall between said first and second chambers.

3. A hydraulic control system according to claim 2, wherein said control piston means and said pressure reducing piston are formed as an integral member extending through a through hole in said partition wall.

4. A hydraulic control system according to claim 1, further comprising a conduit connecting said selector valve means with said pressure applying means, and means, provided with said conduit, for preventing a reverse flow of said second hydraulic pressure from pressure applying means to said selector valve means.

5. A hydraulic control system according to claim 1, wherein said hydraulic control valve includes a stopper formed at said first chamber so as to maintain the disconnection of said input and output ports even when a pressure applied to said output port is higher than said first hydraulic pressure applied to said input port.

6. A hydraulic control system as in claim 1, wherein said first hydraulic pressure producing means further comprises:

booster means for amplifying a pressure applied to a brake pedal; and master cylinder means for generating a first hydraulic pressure.

7. A hydraulic control system for a vehicle having driving wheels comprising:

means for selectively producing a first hydraulic pressure;

wheel cylinder means for braking said driving wheels in response to said production of said first hydraulic pressure;

a hydraulic pump pumping a fluid up to a second hydraulic pressure;

selector valve means, serially connected to said hydraulic pump, for selecting either a by-pass position in a normal mode or, in response to a slip condition of said wheels, selecting a connecting position, and for passing said second hydraulic pressure through said selector valve means when said selector valve means is in said connecting position;

means, connected serially between said wheel cylinder means and said selector valve means, for selectively applying said second hydraulic pressure from selector valve means to said wheel cylinder means in response to said slip condition of said wheels; and a hydraulic control valve connected serially between said first hydraulic pressure producing means and said wheel cylinder means, and commonly connected, with said second hydraulic pressure applying means, to said wheel cylinder means, said hydraulic control valve including:

a valve body having a first cylinder and a second cylinder which are formed separately;

a first chamber formed in each of said first and second cylinders;

a second chamber formed in each of said first and second cylinders;

an input port formed in said valve body so as to communicate with each of said first chambers, and to receive said first hydraulic pressure from said first hydraulic pressure producing means;

an output port formed in said valve body so as to communicate with each of said first chambers and to output said first hydraulic pressure to said wheel cylinder means;

a pressure reducing piston provided slidably within each of said first chambers so as to selectively interconnect said input and output ports;

means for biasing said pressure reducing piston to interconnect said input and output ports, said pressure reducing piston and said biasing means including means for reducing said first hydraulic pressure applied to said input port at a fixed ratio to a lower hydraulic pressure provided at said output port when said first hydraulic pressure applied to said input port is higher than a predetermined level;

a third port formed in said valve body so as to communicate with both of said second chambers, and to receive said second hydraulic pressure from said selector valve means when said selector valve means select said connecting position; and control piston means for disconnecting said input and output ports when said second hydraulic pressure is applied to said third port.

8. A hydraulic control system according to claim 7 wherein said valve body defines a passage connecting said second chamber formed in said first cylinder with said second chamber formed in said second cylinder.

9. A hydraulic control system according to claim 7, further comprising a partition wall separating said first and second chambers in each of said first and second cylinders.

10. A hydraulic control system according to claim 9, wherein said control piston means and said pressure reducing piston are formed as an integral member extending through a through a hole formed in said partition wall.

11. A hydraulic control system according to claim 7, further comprising a conduit connecting said selector valve means with said pressure applying means, and means, provided with said conduit, for preventing a reverse flow of said second hydraulic pressure from said pressure applying means to said selector valve means.

12. A hydraulic control system according to claim 7, wherein said hydraulic control valve includes a stopper formed at said first chamber so as to maintain the disconnection of said input and output ports even when a pressure applied to said output port is higher than said first hydraulic pressure applied to each of said input ports.

13. A hydraulic control system as in claim 7, wherein said first hydraulic pressure producing means further comprises:

booster means for amplifying a pressure applied to a brake pedal; and master cylinder means for generating a first hydraulic pressure.

* * * * *